(12) United States Patent
Umimoto et al.

(10) Patent No.: US 9,546,428 B2
(45) Date of Patent: Jan. 17, 2017

(54) PRODUCING ELECTROLYZED LIQUID

(71) Applicant: Osaka Electro-Communication University, Neyagawa-shi (JP)

(72) Inventors: Koichi Umimoto, Kobe (JP); Shunji Nagata, Nara (JP)

(73) Assignee: OSAKA ELECTRO-COMMUNICATION UNIVERSITY, Neyagawa-Shi (JP)

(*) Notice: Subject to any disclaimer, the term of this patent is extended or adjusted under 35 U.S.C. 154(b) by 143 days.

(21) Appl. No.: 14/115,085

(22) PCT Filed: Mar. 1, 2013

(86) PCT No.: PCT/JP2013/001271
§ 371 (c)(1),
(2) Date: Oct. 31, 2013

(87) PCT Pub. No.: WO2014/132294
PCT Pub. Date: Sep. 4, 2014

(65) Prior Publication Data
US 2014/0246328 A1 Sep. 4, 2014

(51) Int. Cl.
*C25B 9/08* (2006.01)
*C25B 11/03* (2006.01)
(Continued)

(52) U.S. Cl.
CPC ............ *C25B 9/08* (2013.01); *C02F 1/4618* (2013.01); *C25B 11/03* (2013.01); *C02F 1/4674* (2013.01);
(Continued)

(58) Field of Classification Search
CPC ............ C02F 1/4618; C02F 1/4674; C02F 2001/46157; C02F 2001/46185; C02F 2001/4619; C02F 2001/46195; C02F 2201/46115; C25B 11/03; C25B 9/08
See application file for complete search history.

(56) References Cited

U.S. PATENT DOCUMENTS 3,972,794 A * 8/1976 Lamm .......................... 204/266
4,248,689 A * 2/1981 Cunningham ............ C25B 9/08
 204/252

(Continued)

FOREIGN PATENT DOCUMENTS

CN 101759252 A 6/2010
JP 56080293 U 6/1981
(Continued)

OTHER PUBLICATIONS

International Search Report and Written Opinion dated May 29, 2013 in application No. PCT/J132013/001271.
(Continued)

*Primary Examiner* — Keith Hendricks
*Assistant Examiner* — Salil Jain
(74) *Attorney, Agent, or Firm* — Maschoff Brennan

(57) ABSTRACT

An electrolyzer device comprises a container configured to receive liquid to be electrolyzed; a separator arranged in the container so as to define a first chamber and a second chamber positioned lower in a vertical direction than the first chamber; a cathode arranged in the first chamber and operatively connected to a power supply; and an anode arranged in the second chamber and operatively connected to the power supply.

17 Claims, 4 Drawing Sheets

(51) Int. Cl.
  *C02F 1/461* (2006.01)
  *C02F 1/467* (2006.01)
(52) U.S. Cl.
  CPC ............ *C02F 2001/4619* (2013.01); *C02F 2001/46157* (2013.01); *C02F 2001/46185* (2013.01); *C02F 2201/46115* (2013.01); *Y10T 29/49117* (2015.01)

(56) References Cited

U.S. PATENT DOCUMENTS

| | | | |
|---|---|---|---|
| 4,761,208 A * | 8/1988 | Gram et al. | 210/748.19 |
| 5,753,100 A | 5/1998 | Lumsden | |
| 7,186,323 B2 | 3/2007 | Hara | |
| 8,173,006 B2 | 5/2012 | Umimoto | |
| 2004/0055896 A1 * | 3/2004 | Anderson | A01N 59/00 205/701 |
| 2005/0126928 A1 * | 6/2005 | Hung et al. | 205/746 |
| 2005/0189237 A1 | 9/2005 | Sano | |
| 2007/0108064 A1 | 5/2007 | Buckley et al. | |
| 2007/0151865 A1 | 7/2007 | Shimko et al. | |
| 2007/0187263 A1 * | 8/2007 | Field et al. | 205/742 |
| 2009/0008263 A1 | 1/2009 | Achiwa | |
| 2011/0025306 A1 | 2/2011 | Ackermann et al. | |
| 2011/0036779 A1 * | 2/2011 | Bias | B03D 1/1418 210/703 |
| 2011/0266159 A1 * | 11/2011 | Umimoto et al. | 205/748 |
| 2013/0011749 A1 * | 1/2013 | Mita et al. | 429/401 |

FOREIGN PATENT DOCUMENTS

| | | |
|---|---|---|
| JP | 61101296 A | 5/1986 |
| JP | 01150942 U | 10/1989 |
| JP | 06190365 A | 7/1994 |
| JP | 0731976 A | 2/1995 |
| JP | 08132040 A | 5/1996 |
| JP | 08229565 A | 9/1996 |
| JP | 09-033479 A | 2/1997 |
| JP | 09-070581 | 3/1997 |
| JP | 09-262584 A | 10/1997 |
| JP | 10314738 A | 12/1998 |
| JP | 11169856 A | 6/1999 |
| JP | 11350117 A | 12/1999 |
| JP | 2000070947 A | 3/2000 |
| JP | 2000167556 A | 9/2000 |
| JP | 2000254647 A | 9/2000 |
| JP | 2001-246383 A | 9/2001 |
| JP | 2001246383 A | 9/2001 |
| JP | 2003062574 A | 3/2003 |
| JP | 2003236546 A | 8/2003 |
| JP | 2004188300 A | 7/2004 |
| JP | 2011-230076 B1 | 11/2010 |
| JP | 2011016065 A | 1/2011 |
| KR | 10-2006-0029669 A | 4/2006 |
| WO | 2009067213 A2 | 5/2009 |
| WO | 2014034329 A1 | 3/2014 |
| WO | WO 2014114806 A1 * | 7/2014 |

OTHER PUBLICATIONS

"Apia 60," accessed at http://web.archive.org/web/20150505014832/http://www.hokuty.co.jp/apia60111.html, accessed on May 24, 2016, pp. 2.

"Purester," accessed at http://web.archive.org/web/20140702083242/http://www.morinagamilk.co.jp/products/purester/product/, accessed on May 24, 2016, pp. 3.

Abadias, M., et al., "Efficacy of neutral electrolyzed water (NEW) for reducing microbial contamination on minimally-processed vegetables," International Journal of Food Microbiology, vol. 123, Issue 1-2, pp. 151-158 (Mar. 31, 2008).

International Search Report and Written Opinion for International Application No. PCT/JP2012/008363, mailed on Apr. 16, 2013.

Umimoto, K., et al., "Development of automatic controller for providing multi electrolyzed water," World congress on Medical Physics and Biomedical Engineering, vol. 25, No. 7, pp. 306-309 (Sep. 7-12, 2009).

\* cited by examiner

PRODUCING ELECTROLYZED LIQUID

TECHNICAL FIELD

The present disclosure relates to a device and method for producing electrolyzed liquid or electrolytes.

BACKGROUND

Electrolysis is well known as being a method of separating an ionic substance, that is either molten or dissolved in a suitable solution, by way of a chemical reaction. A device for achieving electrolysis may require certain components, such as an electrolyte containing an ionic substance, a pair of electrodes (i.e., an anode and a cathode), and a direct electric current supply to drive chemical reactions at the electrodes. As one example, an electrolyzer device may include a container that retains an electrolyte such as a salt solution (i.e., water solving sodium chloride serving as an electrolysis aid), as well as an anode and a cathode arranged in the container. In the electrolysis process, the salt solution is electrolyzed by chemical reactions, resulting in the production of strongly acidic electrolyzed water (SAEW) at the anode and strongly alkaline electrolyzed water at the cathode. The resulting SAEW contains an available chlorine (AC) such as hypochlorous acid (HClO), which is known to have a strong sterilizing/cleansing action, and which thus enables the killing of various microorganisms such as viruses and bacteria. Further, by way of blending the SAEW and the strongly alkaline electrolyzed water, electrolyzed water having a pH in the physiologically neutral range (i.e., weakly acidic, slightly acidic, neutral) can be obtained. Water having such a neutral pH may be suitable for biological use.

SUMMARY

The embodiment of the electrolyzer device disclosed herein comprises a container configured to receive liquid to be electrolyzed, a separator arranged in the container so as to define a first chamber and a second chamber positioned lower in a vertical direction than the first chamber, a cathode arranged in the first chamber and operatively connected to a power supply, and an anode arranged in the second chamber and operatively connected to the power supply.

In the electrolyzer device thus constituted, the strongly alkaline electrolyzed liquid is produced at the cathode arranged in the first chamber and the strongly acidic electrolyzed liquid is produced at the anode arranged in the second chamber. A portion of the strongly alkaline electrolyzed liquid in the first chamber may be diffused through the separator from the first chamber into the second chamber. Consequently, the mixing of the strongly alkaline electrolyzed liquid and the acidic electrolyzed liquid is proceeding, whereby the electrolyzed liquid having a pH in the physiologically neutral range is produced in the container.

DESCRIPTION OF EMBODIMENTS

Figure 1:
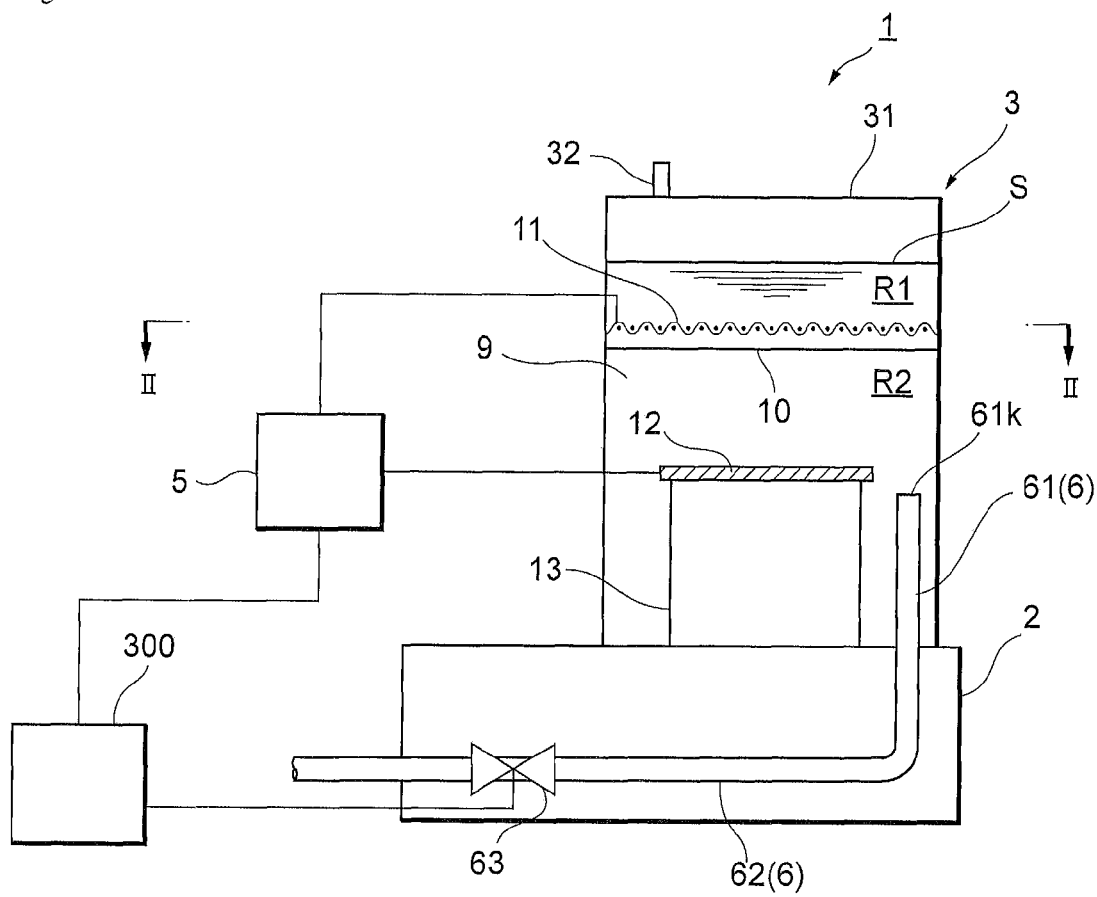
FIG. 1 is a schematic sectional view showing an example of an electrolyzer device arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure describes techniques, devices, apparatuses, systems, and methods for electrolysis including, but not limited to: electrolyzing a liquid in a container by providing energy to a cathode and an anode, arranged in the container, such energy being necessary to cause chemical reactions at the cathode and the anode; obtaining alkaline electrolyzed liquid in the vicinity of the cathode relative to the anode; and obtaining acidic or substantially-neutral electrolyzed liquid in the vicinity of the anode relative to the cathode.

Figure 2:
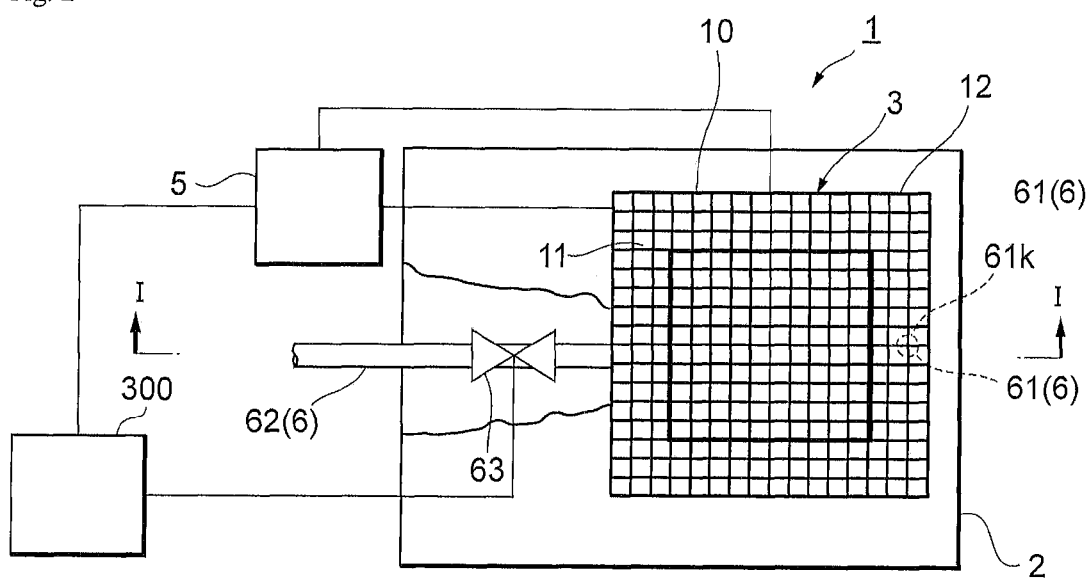
FIG. 2 is a schematic sectional view taken along the line II-II of FIG. 1.

FIGS. 1 and 2 are schematic sectional views showing a non-limiting example of an electrolyzer device arranged in accordance with the present disclosure. The electrolyzer device may be used to produce electrolyzed water having a pH in the physiologically neutral range (i.e., weakly acidic, slightly acidic, neutral) by way of electrolyzing a dilute salt solution S, which may be referred to herein as "liquid to be electrolyzed".

It should be noted that the term "electrolyzed water" as used herein, is a general term for aqueous solutions obtained by providing direct electric current to, for example, tap water and a dilute salt solution in a container through a cathode and an anode. Various types of electrolyzed water may be produced depending on the difference in the electrolyzer and electrolysis system. For example, such electrolyzed waters may be defined in accordance with pH and/or available chlorine (AC) concentration.

Generally, the strongly acidic electrolyzed water (SAEW) may have a large positive "oxidation-reduction potential" (ORP) value, which may represent strong oxidizing power. Further, "available chlorine (AC) concentration" may refer to the total concentration of chlorine contained in free chlorine and binding-form chlorine, and may represent the concentration of chlorine effectively involved in sterilization.

Referring now to FIGS. 1 and 2, an electrolyzer device 1 may include a container 3 arranged on a support base 2. The container 3 may be an electrolysis cell in, for example, a rectangular cylindrical shape. The container 3 may be made of a non-conductive material, such as, but not limited to, a resin polymer like an acrylic resin plate.

In the container 3, a separator 10 having, for example, a planer plate or film shape may be arranged so that a peripheral edge of the separator 10 is in contact with an inner wall of the container 3, thereby the inner space of the container 3 may be separated into two spatial regions. In other words, the separator 10 may define a first chamber R1 and a second chamber R2, which may be positioned lower in a vertical direction than the first chamber R1, in the container 3. The separator 10 may be a diaphragm which may be made of a material such as, but not limited to, a silicon resin film that has an ability to permeabilize the dilute salt solution S.

Further, the separator 10 may be positioned in the container 3 so that a volume of the first chamber R1 may be smaller than a volume of the second chamber R2. It should be noted that the terms "volume" of the first chamber R1 and "volume" of the second chamber R2, as used herein, may correspond to the net volumes of the dilute salt solution S which may be respectively stored within the first chamber R1 and second chamber R2, in the course of electrolysis thereof.

In the first chamber R1 (i.e., an upper spatial region in the container 3), a cathode 11 may be arranged immediately above the separator 10 and in parallel to the separator 10. At least a portion of the cathode 11 may be formed in a net-like fashion such as, but not limited to, a stainless planar wire net so as to enhance the efficiency of the electrolysis. The cathode 11 may be operatively connected to a DC power supply 5.

An anode 12 may be arranged below the separator 10 in the second chamber R2 (i.e., a lower spatial region in the container 3). The anode 12 may be arranged on, and supported by, a support 13 (supporting element) which may be made of a non-conductive material, such as, but not limited to, a resin polymer like an acrylic resin. As a non-limiting example, a distance between the anode 12 and the separator 10 may be wider than that between the cathode 11 and the separator 10. Namely, the cathode 11 may be arranged in a vicinity of the separator 10 relative to the anode 12. As another non-limiting example, the anode 12 may be positioned at an upper part a little more than half of the height of the second chamber R2.

Further, the anode 12 may be a conductive planar type electrode such as, but not limited to, a so-called dimensionally stable electrode (DSE) or a dimensionally stable anode (DSA) in light of stabilizing the efficiency of the electrolysis. More specifically, the dimensionally stable electrode may be made of, for example, a base metal such as titanium with a coating of platinum genus metal oxide like ruthenium oxide, or the like, thereon. The anode 12 may be operatively connected to a DC power supply 5, The container 3 may further include a top cover 31 to seal content in the container 3. The top cover 31 may be provided with an inlet port 32 to supply a dilute salt solution S into the container 3. Although not shown in FIGS. 1 and 2, the electrolyzer device 1 may further include a solution supply system configured to supply the salt solution S to the container 3. The solution supply system may include a reservoir configured to store the salt solution S therein. The salt solution S may be supplied through a pipe operatively connecting the reservoir and the container 3. The pipe may include a flow-rate controller configured to adjust a flow rate of the salt solution S. As a non-limiting example, the solution supply system may supply raw materials of the salt solution S (i.e., water and salt) separately to the container 3, resulting in mixed liquid in the container 3. As another non-limiting example, the raw materials may be mixed within the pipe between the reservoir and the container 3.

Further, a pipe 6, which may include an intake port 61 and delivery pipe 62, may be arranged so as to be in liquid connection with the container 3. The intake port 61, which has an opening 61$k$ at one end thereof, may vertically extend substantially along the internal surface of the container 3. As a non-limiting example, the intake port 61 and the delivery pipe 62 may be unified or integrated by connecting the other end of the intake port 61 to one end of the delivery pipe 62. Further, as shown in FIG. 1, a vertical position of the opening 61$k$ of the intake port 61 may be at substantially half of the height of the second chamber R2. As a result of this, the opening 61$k$ of the intake port 61 may be arranged in the vicinity of the anode 12 in the container 3, but such a vertical position of the opening 61$k$ of the intake port 61 should not be limited.

The delivery pipe 62 may include a portion extending downward and passing through the support base 2 so as to deliver the salt solution S electrolyzed from the intake port 61 to the outside of the electrolyzer device 1. The first pipe 6 may include an on-off valve 63, such as, but not limited to, a solenoid valve, to control a flow of the electrolyzed salt solution S.

Figure 3:
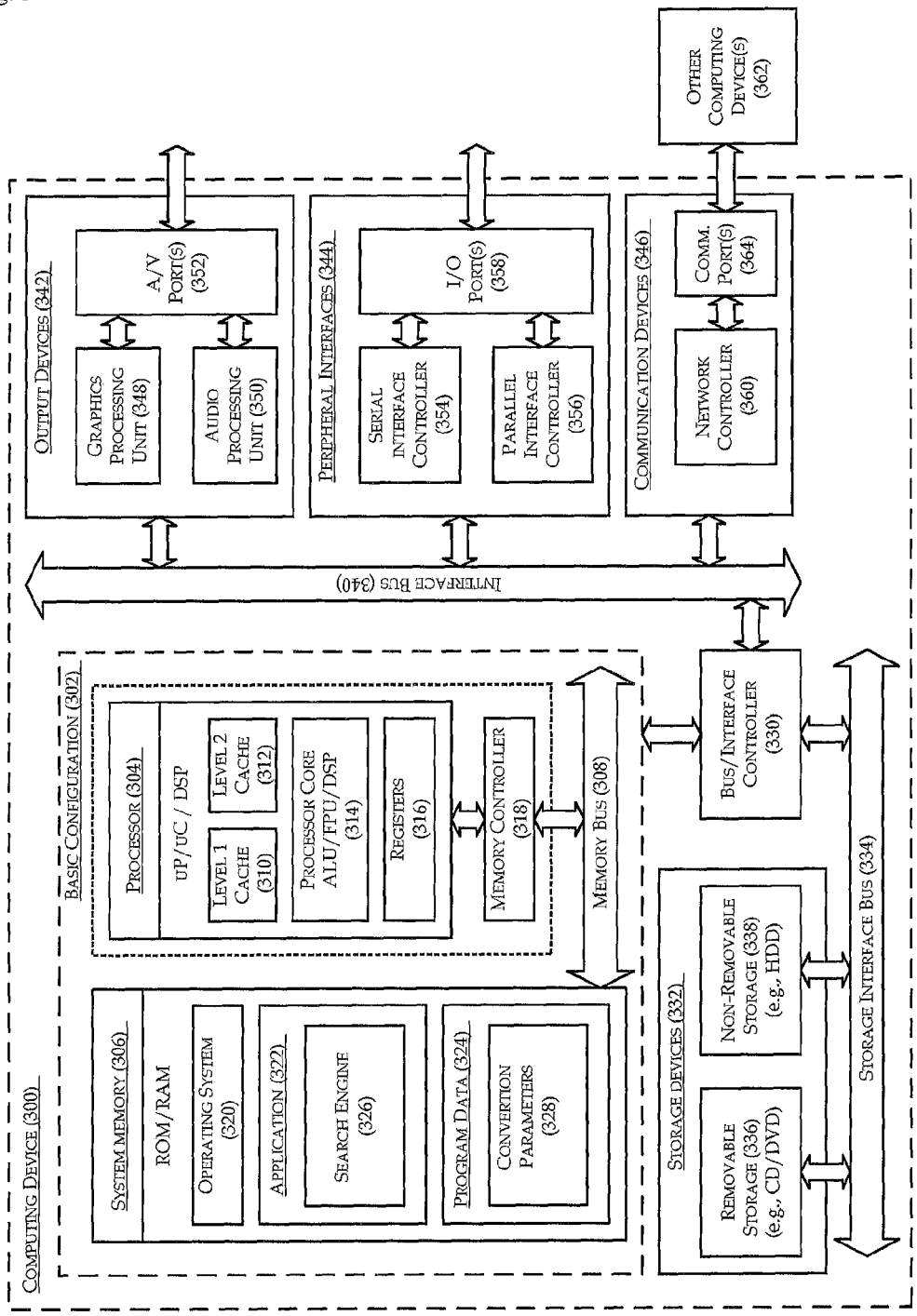
FIG. 3 is a block diagram showing an example of a computing device that is arranged for an electrolyzer device in accordance with the present disclosure.

The electrolyzer device 1 may be comprehensively controlled by a computing device. FIG. 3 is a block diagram showing an example computing device 300 that is arranged for the electrolyzer device 1 in accordance with the present disclosure. In a very basic configuration 302, computing device 300 typically includes one or more processors 304 and a system memory 306. A memory bus 308 may be used for communicating between processor 304 and system memory 306.

Depending on the desired configuration, processor 304 may be of any type including but not limited to a microprocessor, a microcontroller, a digital signal processor (DSP), or any combination thereof. Processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more applications 322, and program data 324. Application 322 may include a control program 326 that is arranged to the electrolyzer device 1. The control program 326 may select, for example, a power of the power supply 5 and an amount of electrolyzed water to be discharged thorough the pipe 6. Program data 324 may include control data 328 that may be useful for the electrolyzer device 1 as is described herein. In some embodiments, application 322 may be arranged to operate with program data 324 on operating system 320 such that the selected power is adjusted and maintained. This described basic configuration 302 is illustrated in FIG. 3 by those components within the inner dashed line.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate network communications with one or more other computing devices 362 over a network communication link via one or more communication ports 364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations.

Figure 4:
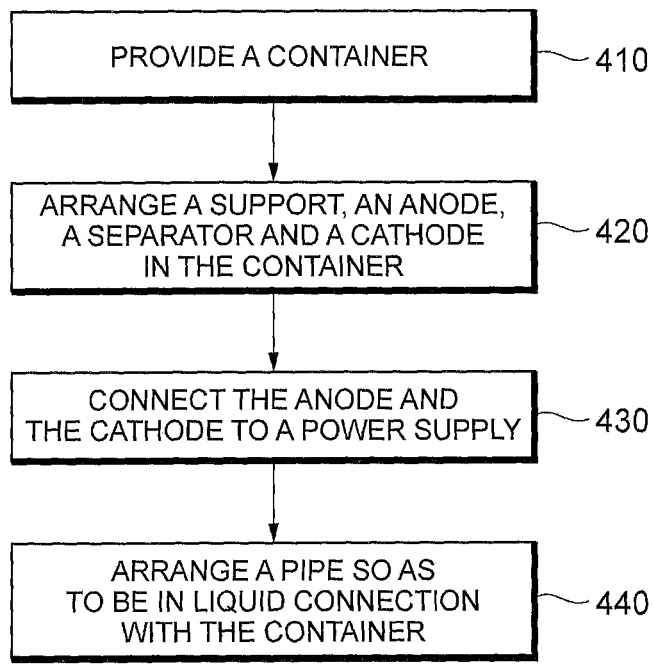
FIG. 4 is a flow chart showing an example of a method for manufacturing an electrolyzer device in accordance with the present disclosure.

FIG. 4 is a flow chart showing an example of a method for manufacturing the electrolyzer device 1 in accordance with the present disclosure. Referring to FIG. 4, in an operation 410, the container 3 to receive a solution such as the salt solution S may be provided on the support base 2. In an operation 420, the support 13, the anode 12, the separator 10 and the cathode 11 may, for example, be arranged in order in the container 3. In this operation, as a non-limiting example, the separator 10 may be provided so as to define the first chamber R1 and the second chamber R2 in the container 3, the second chamber R2 being positioned lower in a vertical direction than the first chamber R1, and provided so that the volume of the first chamber R1 is smaller than the volume of the second chamber R2.

As a further non-limiting example, the separator 10, the cathode 11 and the anode 12 may be arranged in a manner such that the cathode 11 and the anode 12 are respectively positioned in the first chamber R1 and the second chamber R2. As a further non-limiting example, the cathode 11 may be arranged in a vicinity of the separator 10 relative to the anode 11, whereby the spatial gap between the anode 12 and the separator 10 may be wider than that between the cathode 11 and the separator 10.

In an operation 430, the anode 12 may be operatively connected to a positive electrode of the DC power supply 5, whereas the cathode 11 may be operatively connected to a negative electrode of the DC power supply 5. In an operation 440, the pipe 6 having the intake port 61 may be arranged so as to be in liquid connection with the container 3. In this operation, the intake port 61 may be positioned in the vicinity of the anode 12 so that the vertical position of the opening 61k of the intake port 61 may be at substantially half of the height of the second chamber R2.

Figure 5:
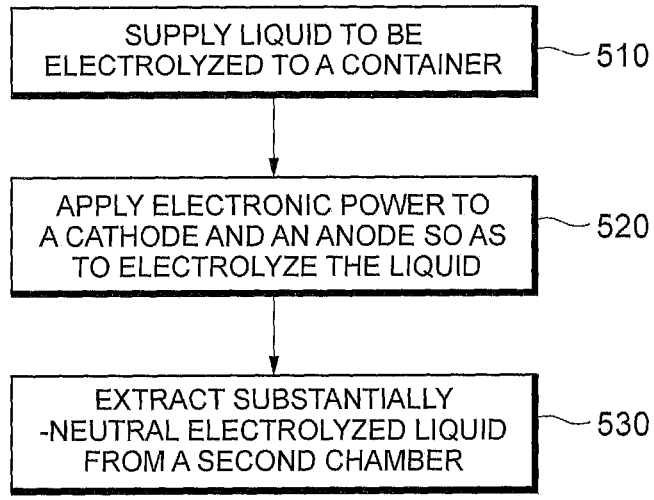
FIG. 5 is a flow chart showing an example of a method for producing electrolyzed liquid that is arranged for an electrolyzer device in accordance with the present disclosure.

FIG. 5 is a flow chart showing an example of a method for producing electrolyzed liquid that is arranged for the electrolyzer device 1 in accordance with the present disclosure. The method may be performed under control of the computing device 300 of the electrolyzer device 1.

Referring to FIG. 5, in an operation 510, the salt solution S may be supplied into the container 3 from the inlet port 32 so that the salt solution S can be in contact with the cathode 11 and the anode 12.

When power (i.e., DC current) is applied to the cathode 11 and the anode 12 by the DC power supply 5, in an operation 520, electrons may be provided therefrom, and thus the electrons may be interchanged between the ions in the salt solution S and a pair of the cathode 11 in the chamber R1 and the anode 12 in the chamber R2. By this way, the following chemical reactions may occur so as to electrolyze the salt solution S.

(Reactions at the Anode)

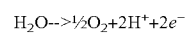

$H_2O \longrightarrow \tfrac{1}{2}O_2 + 2H^+ + 2e^-$

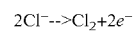

$2Cl^- \longrightarrow Cl_2 + 2e^-$

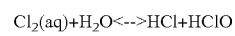

$Cl_2(aq) + H_2O \longleftrightarrow HCl + HClO$

As shown above, at the anode 12, water ($H_2O$) may be electrolyzed into hydrogen ions ($H^+$) and oxygen gas ($O_2$). Further, chlorine gas ($Cl_2$) may be generated from chlorine ions ($Cl^-$). Furthermore, the chlorine gas ($Cl_2$) may be reacted with water ($H_2O$) so as to reversibly produce hydrochloric acid (HCl) and hypochlorous acid (HClO). Consequently, strongly acidic electrolyzed water (SAEW) may be produced at the anode 12 in the chamber R2. Note that, in the above formula, the symbol "<-->" means that the reaction is reversible (the same shall apply hereinafter).

(Reactions at the Cathode)

$$2H_2O+2e^- \longrightarrow H_2+2OH^-$$

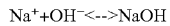

$$Na^+ + OH^- \longleftrightarrow NaOH$$

On the other hand, at the cathode 11 in the chamber R1, water ($H_2O$) may be electrolyzed so as to generate hydrogen gas ($H_2$) and hydroxide ions ($OH^-$). Further, sodium ions ($Na^+$) may react with the hydroxide ions ($OH^-$) so as to reversibly produce sodium hydroxide (NaOH). Consequently, strongly alkaline electrolyzed water may be produced at the cathode 11 in the chamber R1.

As the above reactions proceed, the pH of the salt solution S may gradually be increased in the chamber R1 due to continuous production of anions such as hydroxide ions, and thus, the whole portion of the salt solution S stored within the chamber R1 may be gradually vested with a strong alkalinity since the volume of the chamber R1 is small relative to the volume of the chamber R2. As a result, the strongly alkaline electrolyzed water may be produced in the chamber R1.

On the other hand, the pH of the salt solution S may gradually be decreased in the chamber R2 due to continuous production of cations such as hydrogen ions, and thus, the whole portion of the salt solution S stored within the chamber R2 may be gradually vested with an acidity. In this event, since the volume of the chamber R1 is small relative to the volume of the chamber R2, a large quantity of weakly acidic electrolyzed water may be produced in the chamber R2.

Subsequently, a portion of the strongly alkaline electrolyzed water may be gradually diffused through the separator 10 from the first chamber R1 into the second chamber R2. Consequently, the small quantity of the strongly alkaline electrolyzed water may be mixed with the large quantity of the weakly acidic electrolyzed water. Then, the mixing proceeds, whereby the electrolyzed water having a sterilizing action and a pH in the physiologically neutral range (i.e., weakly acidic, slightly acidic, neutral) suitable for biological use may be quantitatively generated in the second chamber R2 in the container 3.

In an operation 540, the electrolyzed water having a pH in the physiologically neutral range may be introduced into the intake port 61 from an opening 61k thereof when the on-off valve 63 is opened. By this way, such electrolyzed water having a pH in the physiologically neutral range may easily be extracted from the container 3 through the delivery pipe 62.

Figure 6:
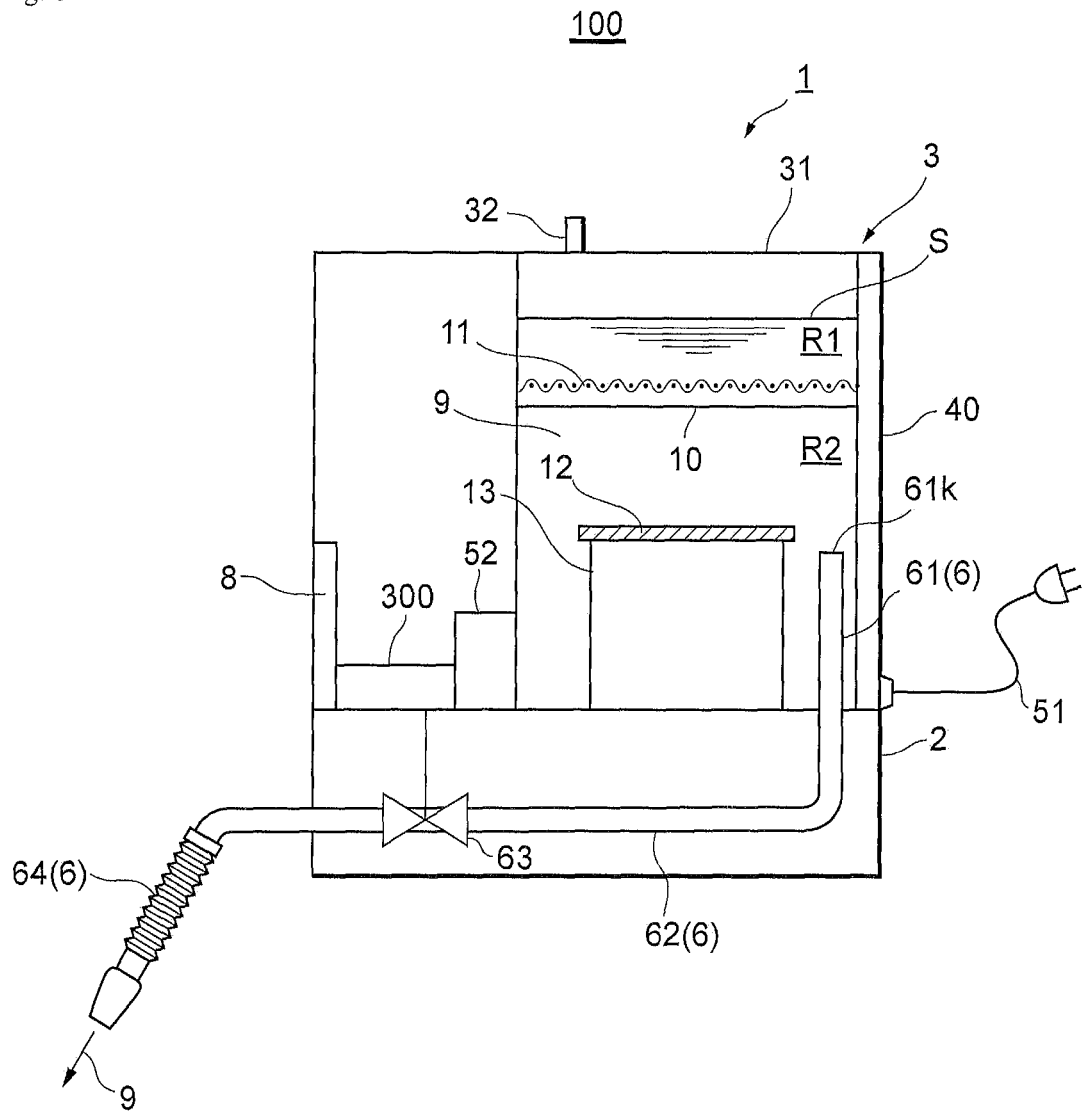
FIG. 6 is a schematic sectional view showing an example of a sterilizing liquid production device using an electrolyzer device arranged in accordance with the present disclosure.
Figure 3:
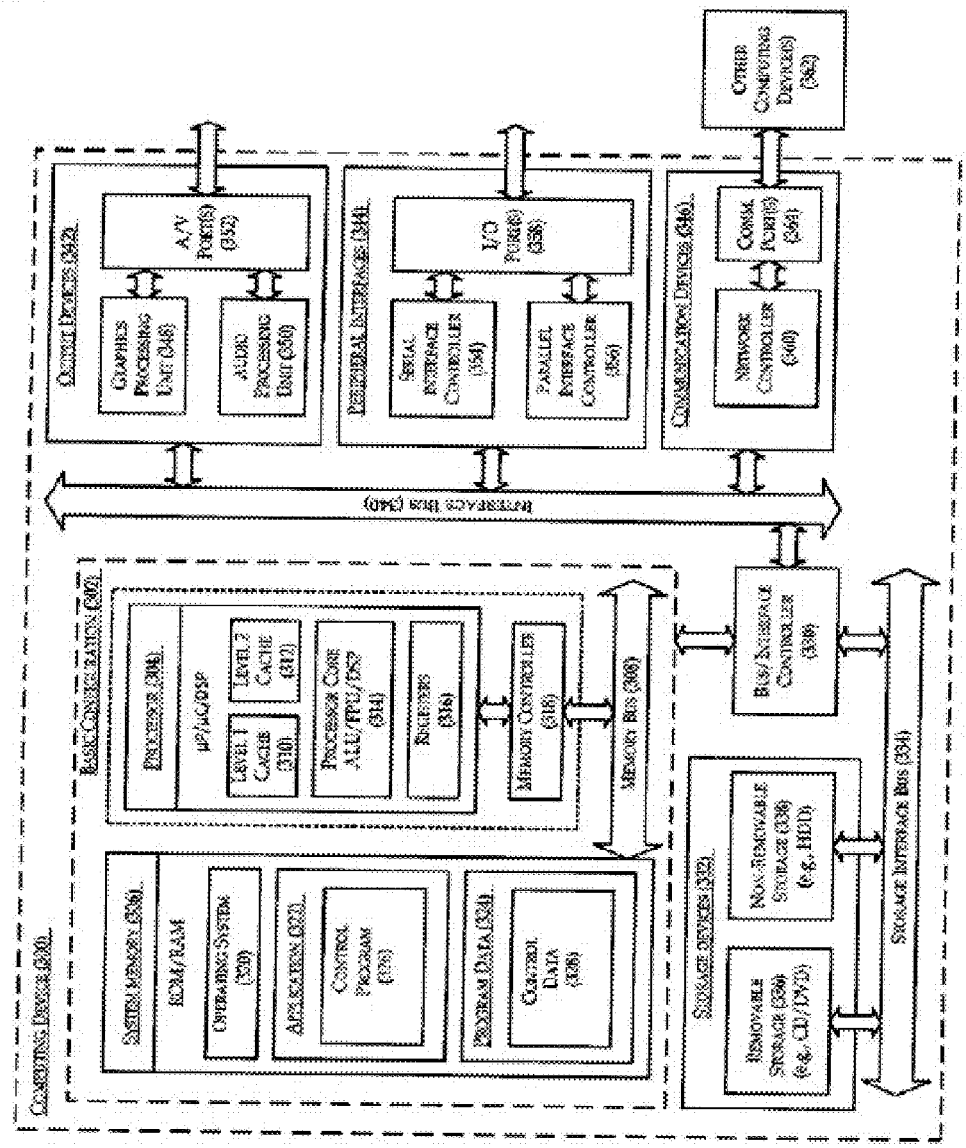

FIG. 6 is a schematic sectional view showing an example of a sterilizing liquid production device using the electrolyzer device 1 arranged in accordance with the present disclosure. Referring to FIG. 6, a sterilizing liquid production device 100 may be configured so as to include the electrolyzer device 1. Specifically, the sterilizing liquid production device 100 may include a housing 40, which may determine, to a large extent, an exterior of the sterilizing liquid production device 100. The housing 40 may accommodate the container 3 of the electrolyzer device 1 therein. The housing 40 may also accommodate the computing device 300 therein. Alternatively, the computing device 300 may be an external device operatively connected to a communication interface provided in the electrolyzer device 1.

The sterilizing liquid production device 100 may also include a display device 8, a screen of which may be arranged at a portion of the housing 40. The sterilizing liquid production device 100 may be configured so that electric power can be supplied from an external, commercial source, and may thus include a cable 51 having a plug to be inserted into an electric outlet, and an AC-DC converter 52 to convert AC current from the commercial source into DC current for the sterilizing liquid production device 100. The delivery pipe 62 of the pipe 6 may be connected to a joint pipe 64 which may have characteristics of flexibility.

The sterilizing liquid production device 100 as discussed above may electrolyze the salt solution S so as to produce the electrolyzed water 9 having a pH in the physiologically neutral range. The produced electrolyzed water 9 may be extracted from the second chamber R2 to the outside through the pipe 6

As a result of the various configurations described in detail above, the present disclosure may include one or more of the following advantages, some of which have been discussed above. For example, according to the present disclosure, electrolyzed water, which may have a sterilizing effect and a pH in the physiologically neutral range suitable for biological use may easily, quantitatively and effectively be produced and obtained by a simple configuration of an electrolyzer device and a simple method using the same. Further, the electrolyzer device may allow the electrolyzed water in the physiologically neutral range to easily be produced without the need to discharge any amount of liquid from the container, thereby avoiding unnecessary disposal of the electrolyzed liquid.

Moreover, as the separator 10 may define the first and second chambers R1, R2 so that the volume of the second chamber R2 may be larger than that of the first chamber R1, the electrolyzed water having a pH in the physiologically neutral range may be more quantitatively and effectively produced.

EXPERIMENTAL EXAMPLE 1

Using an experimental device, which implemented the electrolyzer device 1, a dilute salt solution S was electrolyzed. The values of the pH and available chlorine (AC) concentration of the electrolyzed water extracted from the second chamber R2 through the pipe 6 were measured, by changing the time during which power was applied to the pair of the cathode 11 and the anode 12 (electrolysis time). It should be noted that a pH meter was used for measuring the pH and absorptiometry was used for measuring the AC concentration. Among the obtained measurement results, the pH value and available chlorine (AC) concentration of the extracted electrolyzed water at 0, 2, 4, 6, 8 and 10 minutes after the start of the electrolysis are listed in TABLE 1.

TABLE 1

| Electrolysis Time [min] | pH of Electrolyzed Water Extracted [-] | AC Concentration [ppm] |
| --- | --- | --- |
| 0 | 6.7 | 0.0 |
| 2 | 4.1 | 4.7 |
| 4 | 3.9 | 9.8 |
| 6 | 3.9 | 15.5 |
| 8 | 3.6 | 29.0 |
| 10 | 6.7 | 39.5 |

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having the benefit of this disclosure, will appreciate that other embodiments can be devised which do not depart from the scope of the present disclosure as disclosed herein. Accordingly, the scope of the present disclosure should be limited only by the attached claims.

The invention claimed is:

1. An electrolyzer device comprising:
a container configured to receive liquid to be electrolyzed;
a separator positioned in the container so as to define a first chamber and a second chamber positioned lower in a vertical direction than the first chamber, a volume of the first chamber being smaller than a volume of the second chamber;
a fluid outlet pipe extending into an internal region of the second chamber of the container, the fluid outlet pipe having an intake opening at the internal region of the second chamber;
a cathode positioned in the first chamber and operatively coupled to a power supply; and
an anode positioned in the second chamber and operatively coupled to the power supply,
wherein the liquid is an aqueous salt solution; the container has one or more internal walls that are non-conductive; the cathode extends across the first chamber so as to contact the one or more non-conductive internal walls of the container; the anode is on a non-conductive support; and the anode is dimensioned to provide a gap between the anode and non-conductive internal walls of the container.

2. The electrolyzer device according to claim 1, wherein the cathode is positioned in a vicinity of the separator relative to the position of the anode to that of the separator.

3. The electrolyzer device according to claim 1, wherein the separator is a diaphragm formed from a silicon resin material.

4. The electrolyzer device according to claim 1, wherein a volume of liquid contained in the first chamber is less than a volume of liquid contained in the second chamber.

5. The electrolyzer device according to claim 1, wherein at least one of the separator, the cathode, and the anode is formed in a planar shape.

6. The electrolyzer device according to claim 1, wherein at least a portion of the cathode is formed in a net-like fashion.

7. The electrolyzer device according to claim 1, wherein the anode is a dimensionally stable electrode.

8. A method for producing electrolyzed liquid, comprising:

providing a container configured to receive liquid to be electrolyzed, wherein the container comprises a separator defining a first chamber and a second chamber therein, and an anode in the second chamber and a cathode in the first chamber, the second chamber being positioned lower in a vertical direction than the first chamber, and having a fluid outlet pipe extending into an internal region of the second chamber of the container, the fluid outlet pipe having an intake opening at the internal region of the second chamber;
supplying the liquid to the container;
applying electric power between the anode and the cathode so as to electrolyze the liquid in the container, such that alkaline electrolyzed liquid is produced in the first chamber and acidic electrolyzed liquid is produced in the second chamber;
diffusing alkaline electrolyzed liquid through the separator from the first chamber to the second chamber; and
extracting weakly acidic or substantially-neutral electrolyzed liquid produced from the alkaline electrolyzed liquid and the acidic electrolyzed liquid through the fluid outlet pipe,
wherein the liquid is an aqueous salt solution.

9. The method according to claim 8, further comprising mixing the alkaline electrolyzed liquid produced in the first chamber and the acidic electrolyzed liquid produced in the second chamber so as to obtain the weakly acidic or substantially-neutral electrolyzed liquid.

10. The method according to claim 8, wherein a volume of the liquid contained in the first chamber is less than a volume of the liquid contained in the second chamber.

11. A sterilizing liquid production apparatus comprising the electrolyzer device according to claim 1.

12. The electrolyzer device according to claim 1, comprising a fluid inlet port in a top wall of the first chamber.

13. The electrolyzer device according to claim 1, wherein the intake opening of the fluid outlet pipe is oriented so as to receive liquid from between the anode and an internal wall of the container.

14. The electrolyzer device according to claim 1, wherein the second chamber has a height, and the intake opening is located at about half of the height of the second chamber.

15. The electrolyzer device according to claim 14, wherein the anode is located on a non-conductive supporting member.

16. The electrolyzer device according to claim 15, wherein the anode is planar.

17. The method according to claim 8, wherein alkaline electrolyzed liquid is only removed from the first chamber through the separator into the second chamber.

* * * * *

UNITED STATES PATENT AND TRADEMARK OFFICE
CERTIFICATE OF CORRECTION

PATENT NO. : 9,546,428 B2
APPLICATION NO. : 14/115085
DATED : January 17, 2017
INVENTOR(S) : Umimoto et al.

It is certified that error appears in the above-identified patent and that said Letters Patent is hereby corrected as shown below:

In the Drawings

Replace Drawing Sheet 2 of 4, Fig. 3 with Attached Drawing Sheet 2 of 4, Fig. 3.

In the Specification

In Column 1, below Title, Line 1, insert -- CROSS-REFERENCE TO RELATED APPLICATION
The present application is a U.S. national stage filing under 35 U.S.C. § 371 of International Application No. PCT/JP2013/001271, filed on March 1, 2013. --.

In Column 2, Line 11, delete "DESCRIPTION OF EMBODIMENTS" and insert -- DETAILED DESCRIPTION OF EMBODIMENTS --, therefor.

In Column 3, Line 53, delete "supply 5," and insert -- supply 5. --, therefor.

In Column 8, Line 14, delete "pipe 6" and insert -- pipe 6. --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*